United States Patent [19]

Walker

[11] 3,863,378

[45] Feb. 4, 1975

[54] FISHING LURE

[76] Inventor: Ike J. Walker, 916 S. Rusk St., Gainesville, Tex. 76240

[22] Filed: Aug. 14, 1973

[21] Appl. No.: 388,192

[52] U.S. Cl. ............................. 43/42.28, 43/42.37
[51] Int. Cl. .......................................... A01k 85/00
[58] Field of Search ........................ 43/42.28, 42.37

[56] References Cited
UNITED STATES PATENTS

| | | | |
|---|---|---|---|
| 2,611,986 | 9/1952 | Silva | 43/42.28 |
| 2,883,785 | 4/1959 | Croft | 43/42.28 X |
| 3,465,466 | 9/1969 | Showalter | 43/42.37 X |
| 3,497,987 | 3/1970 | Perrin | 43/42.28 |

Primary Examiner—Louis G. Mancene
Assistant Examiner—Daniel J. Leach
Attorney, Agent, or Firm—Richards, Harris & Medlock

[57] ABSTRACT

A fishing lure is provided which involves a flexible trailer member equipped with a tough but resilient gripping ring at its front end and which further involves a fishing lure body having a post with enlarged shoulder means extending from the rear of the body. The trailer member is engageable with the body by forcing the ring over the shoulder means to overlie the post to support and hold the trailer to the body to provide a stable and effective lure for fishing. Preferably the shoulder is serrated and therefore serves to prevent rotation of the trailer member relative to the fishing lure body.

20 Claims, 9 Drawing Figures

PATENTED FEB 4 1975　　　　　　　　　　　　　　　　　　　3,863,378

FISHING LURE

The invention relates to fishing lures and, more particularly, to lures which involve a relatively rigid body with a flexible tail or other flexible trailer unit connected thereto.

It is well known that shirts, streamers, shrimp tails, plastic worms and a variety of other trailing members of a flexible nature may be attached to the solid body of a fishing lure to make the lure more attractive in appearance and action to the fish. For example, conventional jigs, made of lead or other metal material with plastic worms threaded into the hook thereof, are often used by the fisherman with relatively good results. Another popular bait in some vicinities includes the flexible shrimp tail member carried on a hooked jig.

While the lures mentioned above have generally been successful, a substantial problem is created by the tendency of the flexible trailer to become disconnected or torn from the relatively rigid body member of the lure. Commonly, the trailer member is lost quite easily or it pulls or slips into a crooked or otherwise abnormal position in which the combination of the body and the trailer member do not perform properly to attract fish.

In accordance with the present invention it has been found that the problem just referred to may be solved, or at least materially alleviated, by utilizing annular means of a tough but somewhat resilient character in conjunction with the pliable trailer to provide a means to grip a portion of the lure body tightly to assist in holding the trailer in position. Moreover, it has been found that a post member with an enlarged head or shoulder may be provided for a lure body to more securely receive the trailer and hold it in engagement.

In accordance with a preferred embodiment of the present invention, a trailer member of a pliable plastic material is equipped with a resilient but quite tough annular ring adjacent its forward end. The ring is bonded to the pliable plastic material and concentrically disposed about the soft plastic which it overlies. The body to which this preferred trailer member is adapted for attachment is formed with an extending post that has an enlarged head or shoulder region at its extremity. The diameter of the resilient but tough ring relative to the diameter of the enlarged head portion is such that the ring may be forced over the head portion to lie concentrically about the extending post, thereby compressing the soft material of the trailer between the ring and the body of the lure to impose a gripping action. By this means the trailer is held firmly in its intended position with respect to the lure and it cannot be disengaged without being torn loose by a quite substantial force, one much greater than is often encountered in the normal course of fishing, even in brush-filled waters.

A more complete understanding of the invention may be had by referring to the following detailed description when taken in conjunction with the accompanying drawings wherein.

Figure 1:
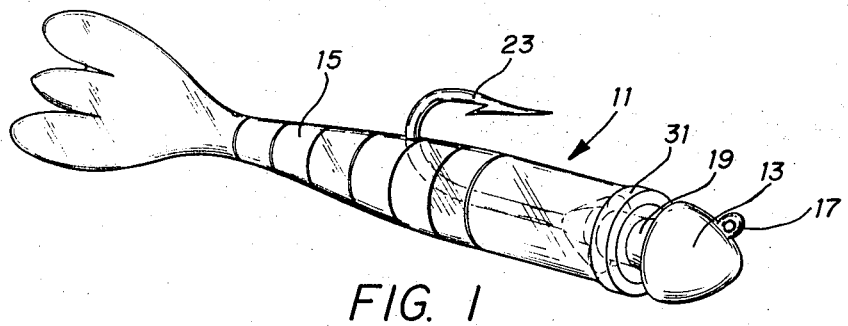
FIG. 1 is a perspective view of an embodiment of the present invention in which the trailer member is a shrimp tail configuration made of a clear, pliable plastic material which may be of any desired color and in which the body is a metallic jig with a hook depending from the extremity thereof.
Figure 2:
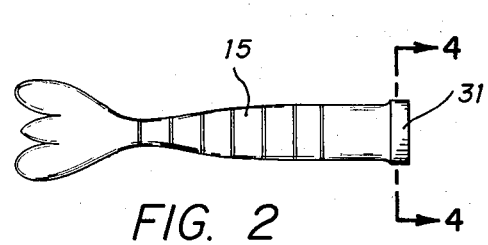
FIG. 2 is a side view of the trailer of FIG. 1.

Referring now to the drawings, and more particularly to FIG. 1, therein is illustrated in perspective the lure 11. This fishing lure consists of two main portions, the body 13 and the flexible trailer member 15. The body is equipped with a conventional eye 17 which may be attached to a fishing line. Extending rearwardly and integrally from the body is the post region 19, which terminates in the raised shoulder region or head portion 21. Conventional hook 23 extends rearwardly and coaxially from the central portion of shoulder 21. Hook 23 includes the shank 25, the curved portion 27, and the conventional point or barb 29.

Joined to the body 13, so that its forward portion is engaged to overlie the post 19 and shoulder 21, is the trailer member 15, which in this particular embodiment takes the form of a shrimp, or shrimp tail.

The shrimp tail trailer 15, as is common with the other trailers used in conjunction with the present invention, is made of a soft, pliable plastic material, for example polyvinylchloride. Trailer 15 is normally made by the usual molding processes by which shrimp tails, worms, crayfish and other artificial plastic lures are commonly made today in large quantity, and such process is well known in the art and will not be described herein. The trailer 15 may be opaque, translucent, or transparent, and may be of any desired color or of multiple colors, in accordance with particular requirements.

The trailer 15 is equipped with the annular member 31, which in the embodiment illustrated in FIGS. 1–5 takes the form of a ring of a resilient but tough material. For example, the ring 31 may be made of a tough plastic such as Tygon, hard butadiene or other similar tough material still possessing some degree of elasticity.

Figure 4:
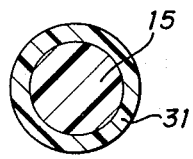
FIG. 4 is a section taken along line 4—4 of FIG. 2.

The ring 31 is bonded to the trailer 15, as can best be seen from the sectional view of FIG. 4. This bonding is accomplished preferably by supporting the ring in the mold throughout the course of the molding process. During the course of solidification of the pliable plastic material which forms the trailer 15, that material adheres to the inner surfaces of the ring 31 to form a good bond therewith.

From reference to FIG. 1, it will be noted that the trailer 15 is carried on the body 13 with the ring 31 overlying the post 19 of body 13. The inside diameter of the ring 31 relative to the outside diameter of the post 19 in such that the soft plastic material of the trailer 15 is compressed between the ring 31 of the body 13 to impose a gripping action. However, the material of construction of the ring 31 is sufficiently resilient that it may be mounted in its assembled position on the post 19 by forcing the ring over the shoulder 21 and pushing it further forward to overlie the post 19, as illustrated in FIG. 1. It will be noted that the hook 23 must first have its barb 29 engaged with the surface of the plastic material of trailer 15 and that it then must be forced into the trailer and pushed concentrically along the shank in order to permit the ring and any underlying soft plastic material to ride over the shoulder 21 and go into position on the post 19. Fishermen are accustomed to placing hooks through soft, pliable moldable plastic bodies, e.g., plastic worms, and no further description of the simple procedure involved in this aspect of positioning and threading of the trailer with respect to the hook and hook shank will be given herein.

Figure 3:
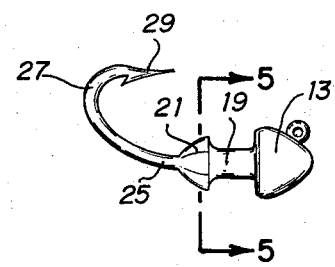
FIG. 3 is a side view of the body of FIG. 1.
Figure 5:
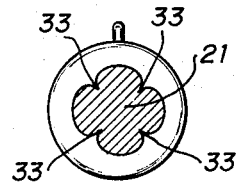
FIG. 5 is a section taken along line 5—5 of FIG. 3.

As can be seen from FIGS. 3 and 5, the embodiment of lure body 13 illustrated therein carries a plurality of grooves 33 along the surface of its shoulder portion 21. It will be noted that shoulder 21 is generally of conical shape, and that these grooves 33 are formed along the surface to run coaxial with the body 13 and its extending rearward post portion 19. The depths of these grooves may vary from being relatively superficially cut to being cut as deeply as desired, for example, to run flush with the outer circumference to the post position 19 from which the shoulder 21 projects.

The grooves 33 are helpful in militating against rotation of the pliable trailer 15 since such grooves define a serrated shoulder or, stated somewhat differently, a plurality of separate lug member or projections to dig into the flexible material when the pliable trailer tends to rotate. Thus, in effect, the serrated shoulder provided means to resist rotation of the pliable trailer.

Referring again to FIG. 1, the assembled lure 11 comprises the body 13 having the trailer 15 securely affixed thereto. In the assembled condition, the tough but resilient ring 31 overlies the post 19, thereby compressing the soft material of the trailer 15 between the post and the ring. On the other hand, the shoulder 21 displaces the soft material of the trailer 15 outwardly in the region behind the ring 31. By this means the trailer 15 is securely affixed to the body 13 notwithstanding the fact that the inside diameter of the ring 31 may actually be somewhat larger than the outside diameter of the shoulder 21.

Figure 6:
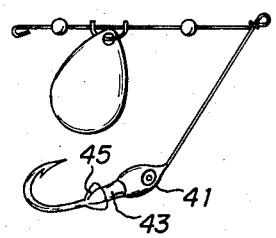
FIG. 6 is a side view of an alternate embodiment of a body made in accordance with the present invention.

The present invention may be utilized in conjunction with a variety of lure body shapes. Thus, the lure of FIG. 6, identified by numeral 41, may be readily substituted for the lure body 13 illustrated in FIGS. 1-5. It will be noted that lure body 41 is equipped with the post 43 and serrated shoulder 45 which correspond respectively to post 19 and shoulder 21 of lure body 13.

Figure 7:
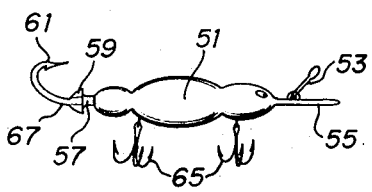
FIG. 7 is yet another embodiment of the lure body of the present invention.

Another example of a lure body utilizable as an aspect of the present invention is illustrated in FIG. 7. Therein, lure body 51, equipped with fishing swivel 53 and bill 55, has metallic post 57 and serrated shoulder 59 extending from the rearward portion thereof. As contrasted to bodies 13 and 41, the major portion of body 51 could be be described as a plug, in the usual parlance of fishing, as contrasted to the jig-like configuration of the former examples. The metallic post 57 may be screwed into or cast in the main body 51 in the process of manufacture, the method of attachment depending entirely on convenience and on the material of construction of the main body portion 51. If plug body 51 is of wood, then the post 57 with a shoulder 59 carried by it would best be screwed into the body, while if the plug body 51 is cast of plastic, the post 57 would be inserted to be set in place during the molding process. It will be understood that the post 57 may also be formed from materials other than metal, such as wood, plastic, etc., if desired.

While plug 51 is shown to have hook 61 extending with its shank concentric with and rearwardly from the shoulder 59, it will be appreciated that the hook 61 is not essential to this particular lure since it is equipped with lower treble hooks 65. In the event that the hook 61 is eliminated, it is desirable in some instances for convenience of installing the particular trailer to be selected that some projection extend a short distance rearwardly and concentrically from the shoulder 59 in order to assist in threading the trailer onto the shoulder and ultimately to overlie the post 57. This can be accomplished by having a short concentric shaft in the position occupied by the shank of hook 61, which can be visualized as if the curved portion of hook 61 had been cut off to leave a short projecting portion of the shank 67 as a means to assist in threading the trailer and emplacing the trailer in its assembled position.

Figure 8:
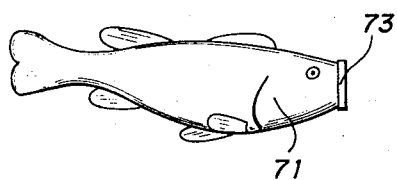
FIG. 8 is an alternate embodiment of the trailer member of the present invention.
Figure 9:
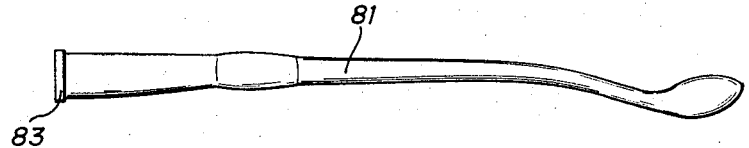
FIG. 9 is yet another embodiment of the trailer member of the present invention.

FIGS. 8 and 9 illustrate two other configurations of trailers which may be utilized. Thus, minnow 71, of a molded pliable plastic material, has its front region equipped with annular means or ring 73, which is in all respects like ring 31 and which is bonded to the minnow 71 in the same manner as is ring 31 to the trailer 15. In like manner, the pliable plastic worm 81 is equipped with ring 83 at its forward end.

It will thus be appreciated that the trailers 15, 71 and 81 are all adhered to a tough but resilient gripping ring of the same character and in the same manner as is illustrated in connection with the more detailed description above regarding the shrimp trailer 15.

Any of the trailers illustrated herein (trailers 15, 71 or 81) may be used in conjunction with any one of bodies 13, 41 or 51. In all cases, the gripping ring is forced over the serrated shoulder until it overlies the post portion of the particular body.

From the foregoing, it will be appreciated that a wide variety of bodies may be utilized in conjunction with a wide variety of trailer shapes. The precise shape of the trailers or of the bodies is hence of no great significance with respect to the main aspects of the present invention.

Although preferred embodiments of the invention have been illustrated in the drawings and described in the foregoing detailed description, it will be understood that the invention is not limited to the embodiments so disclosed, but is capable of rearrangement, modification and substitution of parts and elements without departing from the spirit of the invention.

What is claimed is:

1. A fishing lure comprising:
    an enlarged lure body having a rearwardly extending trailer engaging post with an enlarged head portion at the rear end thereof, a fixed hook extending from the extremity of said post;
    a solid trailer of soft pliable material, a portion of one end of said trailer is threaded onto said hook and over said post;
    a resilient ring concentrically overlying a portion of said one end of said trailer, said ring being of less pliable material than said trailer and having an inside diameter relative to the outside diameter of the post such that soft pliable material of said one end of said trailer is compressed between the ring and the body to effect a gripping action on the post and being elastically deformable to permit said ring to be forced over said head for holding said trailer in engagement with said lure body.

2. The lure of claim 1 wherein said ring is bonded to said trailer and wherein said head portion includes means to resist rotation of said trailer.

3. The lure of claim 2 wherein the shank of said hook is coaxially joined to the extremity of said head.

4. The lure of claim 2 wherein said means comprise a plurality of axially directed grooves formed in the surface of said head portion.

5. A fishing lure comprising:
a substantially rigid body portion and a trailer member, said body having a rearwardly extending trailer engaging post carrying diametrically enlarged shoulder means, a hook rigidly extending from the extremity of said post; said trailer member comprising a solid molded soft pliable trailer with the forward end threaded over said hook and said post; and an annular member of resilient material having less pliability than said molded soft trailer, said annular member being disposed adjacent the forward end of said soft plastic trailer and being bonded thereto, said annular member having an inside diameter smaller sized relative to the post to securely grip the trailer in engagement with the body and being elastically deformable to permit said annular member to be forced over said shoulder means to be concentrically disposed about said post.

6. The fishing lure of claim 5 wherein said shoulder means has means associated therewith to resist rotation of said trailer member.

7. A fishing lure comprising:
a body having a relatively small diameter post portion extending through a predetermined length to a relatively large diameter shoulder portion, a fixed hook extending from the extremity of said post;
a trailer member comprising a solid body of relatively soft plastic material and being cylindrical in shape at least adjacent one end thereof; and
a ring comprising a body of relatively tough plastic material encircling and securely bonded to the cylindrical end of the trailer member;
said cylindrical end of the trailer member being threaded over the shoulder to position the ring in alignment with the post so that the relatively soft plastic material of the trailer member is compressed between the ring and the post and is expanded by the shoulder in the region behind the post to securely affix the trailer member to the body of the lure.

8. The lure according to claim 7 wherein the shoulder portion of the body further comprises means for preventing rotation of the trailer member relative to the body.

9. The lure according to claim 7 wherein the ring has an axial length which is less than the predetermined length of the post portion of the body.

10. The lure according to claim 7 wherein the shank of said hook extends coaxially from the post and through the trailer member and including a barb located outside of the trailer member.

11. For use with a fishing lure body having a post with an enlarged head, said post and head being adapted to receive a trailer member attached concentrically thereover, a trailer member comprising:
a soft pliable trailer of vinyl material; and
a resilient ring bonded to said trailer and concentrically disposed adjacent an end thereof, said ring being of a less pliable material than the material of construction of said plastic trailer, said ring is bonded to said trailer by supporting said ring in the mold throughout the molding process whereby the material adheres to surface areas of said ring as said molten plastic material hardens.

12. The lure of claim 11 wherein the ring has an axial length which is less than the length of said post.

13. A trailer member for use with a fishing lure body having a post with an enlarged head, said post and head being adapted to receive a trailer member attached concentrically thereover, the trailer member has a soft pliable plastic trailer, a resilient ring bonded to said trailer and concentrically disposed adjacent an end thereof, said ring being of a less pliable material than the material for of of said plastic trailer;
the improvement which comprises said plastic trailer is a molded vinyl material and said ring is bonded thereto by supporting said ring in the mold throughout the molding process whereby the material adheres to surface areas of said ring as said molten plastic material hardens.

14. The lure of claim 13 wherein the ring has an axial length which is less than the length of said post.

15. A fishing lure comprising in combination:
a fishing lure body having a post with an enlarged head; and
a trailer member concentrically attached over said post and head, said trailer comprising a soft pliable trailer of vinyl material, and a resilient ring bonded to said trailer and concentrically disposed adjacent an end thereof, said ring being of a less pliable material than the material of construction of said plastic trailer, said ring is bonded thereto by supporting said ring in the mold throughout the molding process whereby the material adheres to surface areas of said ring as said molten plastic material hardens.

16. The lure of claim 15 wherein said head includes means to resist rotation of said trailer.

17. The lure of claim 15 further comprising hook means having a shank which extends rearwardly from the head end of said post.

18. The lure of claim 17 wherein the shank of said hook means is coaxially joined to the extremity of said head.

19. The lure of claim 16 wherein said means to resist rotation comprises a plurality of axially directed grooves formed in the surface of said head.

20. The lure of claim 15 wherein the ring has an axial length which is less than the length of said post.

\* \* \* \* \*

UNITED STATES PATENT OFFICE
CERTIFICATE OF CORRECTION

Patent No. 3,863,378    Dated February 4, 1975

Inventor(s) IKE J. WALKER

It is certified that error appears in the above-identified patent and that said Letters Patent are hereby corrected as shown below:

Col. 1, line 6, after "that" and before "streamers", change "shirts" to --skirts--.

Col. 2, line 55, after "19" and before "such", change "in" to --is--.

Col. 2, line 56, after "31" and before "the", change "of" to --and--.

Col. 3, line 3, before "plastic" change "moldable" to --molded--.

Col. 3, line 17, after "circumference" and before "the", change "to" to --of--.

Col. 3, line 51, after "could" and before "be", change "be" to --best--.

Col. 6, line 22, after "material" and before "of", delete "for of"; and after "of" and before "said", insert --construction of--.

Signed and sealed this 8th day of April 1975.

(SEAL)
Attest:

RUTH C. MASON
Attesting Officer

C. MARSHALL DANN
Commissioner of Patents
and Trademarks